(12) United States Patent
Kung et al.

(10) Patent No.: US 9,866,060 B2
(45) Date of Patent: Jan. 9, 2018

(54) APPARATUS FOR PERFORMING HYBRID POWER CONTROL IN AN ELECTRONIC DEVICE TO ALLOW CHARGING USING ANY OF HIGH POWER ADAPTORS CORRESPONDING TO DIFFERENT VOLTAGES

(71) Applicant: MEDIATEK INC., Hsin-Chu (TW)

(72) Inventors: Nien-Hui Kung, Hsinchu (TW);
Chih-Wei Lin, Hsinchu (TW);
Yen-Hsun Hsu, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 72 days.

(21) Appl. No.: 15/158,574

(22) Filed: May 18, 2016

(65) Prior Publication Data

US 2017/0179757 A1 Jun. 22, 2017

Related U.S. Application Data

(60) Provisional application No. 62/270,073, filed on Dec. 21, 2015.

(51) Int. Cl.
| | |
|---|---|
| *H02J 7/00* | (2006.01) |
| *H02J 7/16* | (2006.01) |
| *H02J 7/02* | (2016.01) |
| *H02J 1/10* | (2006.01) |
| *H02J 7/04* | (2006.01) |

(52) U.S. Cl.
CPC . *H02J 7/16* (2013.01); *H02J 1/10* (2013.01); *H02J 7/007* (2013.01); *H02J 7/0055* (2013.01); *H02J 7/0068* (2013.01); *H02J 7/025* (2013.01); *H02J 7/04* (2013.01); *H02J 2007/0095* (2013.01)

(58) Field of Classification Search
CPC ........ H02J 7/025; H01F 38/14; Y02T 90/122; B60L 11/182; Y02E 60/12
USPC .......................................................... 320/108
See application file for complete search history.

(56) References Cited

U.S. PATENT DOCUMENTS

| 2004/0098068 A1* | 5/2004 | Carbunaru ........... A61N 1/3605 607/60 |
| 2005/0253560 A1* | 11/2005 | Popescu-Stanesti ...... H02J 1/08 320/138 |

(Continued)

FOREIGN PATENT DOCUMENTS

EP 3 057 213 A1 8/2016

*Primary Examiner* — Arun Williams
(74) *Attorney, Agent, or Firm* — Winston Hsu

(57) ABSTRACT

An apparatus for performing hybrid power control in an electronic device includes a charger positioned in the electronic device, and the charger is arranged for selectively charging a battery of the electronic device. In addition, at least one portion of the charger is implemented within a charger chip, and the charger may include: a plurality of terminals that are positioned on the charger chip; a plurality of switching units, positioned on the charger chip; and at least one control circuit, positioned on the charger chip and coupled to the plurality of switching units. For example, the control circuit may be arranged for controlling the plurality of switching units to allow charging using any of a plurality of adaptors corresponding to different voltages, wherein a first charging path and a second charging path of the charger correspond to a first adaptor and a second adaptor within the plurality of adaptors, respectively.

20 Claims, 3 Drawing Sheets

(56) References Cited

U.S. PATENT DOCUMENTS

| | | | |
|---|---|---|---|
| 2010/0318252 A1* | 12/2010 | Izumi | B60K 6/365 |
| | | | 701/22 |
| 2013/0069442 A1* | 3/2013 | Kim | H02J 5/005 |
| | | | 307/104 |
| 2013/0106192 A1* | 5/2013 | Tsukamoto | H02J 7/0068 |
| | | | 307/72 |
| 2014/0159496 A1 | 6/2014 | Lee | |
| 2015/0069951 A1 | 3/2015 | Wang | |
| 2015/0280473 A1 | 10/2015 | Zhao | |
| 2015/0280486 A1 | 10/2015 | Hsu | |

* cited by examiner

APPARATUS FOR PERFORMING HYBRID POWER CONTROL IN AN ELECTRONIC DEVICE TO ALLOW CHARGING USING ANY OF HIGH POWER ADAPTORS CORRESPONDING TO DIFFERENT VOLTAGES

CROSS REFERENCE TO RELATED APPLICATIONS

This application claims the benefit of U.S. Provisional Application No. 62/270,073, which was filed on Dec. 21, 2015, and is included herein by reference.

BACKGROUND

The present invention relates to charger control in a portable electronic device, and more particularly, to an apparatus for performing hybrid power control in an electronic device.

According to the related art, a conventional charger system may be implemented within a conventional multifunctional mobile phone for charging a battery thereof, and the conventional charger system may have a charging path corresponding to an output voltage of a fast charging adaptor outside the conventional multifunctional mobile phone. Based on this conventional design, some problems such as some side effects may occur. For example, as the output voltage of the fast charging adaptor is typically very low (e.g. 4 Volts (V)), the output current of the fast charging adaptor is typically very high (e.g. 6 Amperes (A)), causing a Metal Oxide Semiconductor Field Effect Transistor (MOSFET) on the charging path to have a high voltage drop when the MOSFET is turned on. In addition, the high voltage drop may vary with respect to time due to on resistance variation of the MOSFET (e.g. the variation of the resistance of the MOSFET when it is turned on). As a result, using the fast charging adaptor may lead to damage of the battery and/or damage of the conventional charger system. Thus, a novel architecture is required for performing fast charging with fewer side effects.

SUMMARY

It is an objective of the claimed invention to provide an apparatus for performing hybrid power control in an electronic device, in order to solve the above-mentioned problems.

It is another objective of the claimed invention to provide an apparatus for performing hybrid power control in an electronic device, in order to perform fast charging using any of a plurality of adaptors (e.g. a set of high power adaptors) corresponding to different voltages.

According to at least one preferred embodiment, an apparatus for performing hybrid power control in an electronic device is provided, where the apparatus may comprise at least one portion (e.g. a portion or all) of the electronic device. For example, the apparatus may comprise a charger that is positioned in the electronic device, and the charger may be arranged for selectively charging a battery of the electronic device, wherein at least one portion (e.g. a portion or all) of the charger may be implemented within a charger chip. More particularly, the charger may comprise: a first terminal, positioned on the charger chip; a second terminal, positioned on the charger chip and selectively coupled to the first terminal; a third terminal, positioned on the charger chip and selectively coupled to the second terminal; a fourth terminal, positioned on the charger chip; a battery terminal, positioned on the charger chip; a plurality of switching units, positioned on the charger chip; a control module comprising at least one control circuit (e.g. one or more control circuits), positioned on the charger chip and coupled to the plurality of switching units; and a feedback control circuit, positioned on the charger chip and coupled to the control module. For example, the first terminal may be arranged for coupling the charger to a power input port of the electronic device, wherein the power input port is utilized for selectively obtaining external power from outside the electronic device. The second terminal may be arranged for delivering the external power obtained through the first terminal to at least one internal component of the charger chip when needed, and the third terminal and the fourth terminal may be arranged for installing an inductor of the charger, wherein a first terminal of the inductor may be coupled to the third terminal, and a second terminal of the inductor may be coupled to the fourth terminal. The battery terminal may be arranged for coupling the charger to the battery. In addition, the plurality of switching units may be arranged for selectively enabling or disabling partial paths between components within the charger, wherein the plurality of switching units comprises: a first switching unit that is coupled between the second terminal and the third terminal; a second switching unit that is coupled between the second terminal and the first terminal; a third switching unit that is coupled between the fourth terminal and the battery terminal, wherein a first charging path of the charger passes through the second switching unit, the first switching unit, and the third switching unit; and an additional switching unit that is coupled between the first terminal and the battery terminal, wherein a second charging path of the charger passes through the additional switching unit. Additionally, the control module (more particularly, the aforementioned at least one control circuit) may be arranged for controlling the plurality of switching units to allow charging using any of a plurality of adaptors corresponding to different voltages, wherein the first charging path and the second charging path correspond to a first adaptor and a second adaptor within the plurality of adaptors, respectively. Further, the feedback control circuit may be arranged for performing feedback control on the second charging path through the additional switching unit.

According to at least one preferred embodiment, an apparatus for performing hybrid power control in an electronic device is provided, where the apparatus may comprise at least one portion (e.g. a portion or all) of the electronic device. For example, the apparatus may comprise a charger that is positioned in the electronic device, and the charger may be arranged for selectively charging a battery of the electronic device, wherein at least one portion (e.g. a portion or all) of the charger may be implemented within a charger chip. More particularly, the charger may comprise: a first terminal, positioned on the charger chip; a second terminal, positioned on the charger chip and selectively coupled to the first terminal; a third terminal, positioned on the charger chip and selectively coupled to the second terminal; a fourth terminal, positioned on the charger chip; a battery terminal, positioned on the charger chip; another first terminal, positioned on the charger chip; a plurality of switching units, positioned on the charger chip; a control module comprising at least one control circuit (e.g. one or more control circuits), positioned on the charger chip and coupled to the plurality of switching units; and a feedback control circuit, positioned on the charger chip and coupled to the control module. For example, the first terminal may be arranged for coupling the charger to a power input port of the electronic device, wherein the power input port is utilized for selectively obtaining external power from outside the electronic device. The second terminal may be arranged for delivering the external power obtained through the first terminal to at least one internal component of the charger chip when needed, and the third terminal and the fourth terminal may be arranged for installing an inductor of the charger, wherein a first terminal of the inductor may be coupled to the third terminal, and a second terminal of the inductor may be coupled to the fourth terminal. The battery terminal may be arranged for coupling the charger to the battery, and the other first terminal may be arranged for coupling the charger to another power input port of the electronic device, wherein the other power input port is utilized for selectively obtaining external power from outside the electronic device. In addition, the plurality of switching units may be arranged for selectively enabling or disabling partial paths between components within the charger, wherein the plurality of switching units comprises: a first switching unit that is coupled between the second terminal and the third terminal; a second switching unit that is coupled between the second terminal and the first terminal; a third switching unit that is coupled between the fourth terminal and the battery terminal, wherein a first charging path of the charger passes through the second switching unit, the first switching unit, and the third switching unit; and an additional switching unit that is coupled between the other first terminal and the battery terminal, wherein a second charging path of the charger passes through the additional switching unit. Additionally, the control module (more particularly, the aforementioned at least one control circuit) may be arranged for controlling the plurality of switching units to allow charging using any of a plurality of adaptors corresponding to different voltages, wherein the first charging path and the second charging path correspond to a first adaptor and a second adaptor within the plurality of adaptors, respectively. Further, the feedback control circuit may be arranged for performing feedback control on the second charging path through the additional switching unit.

According to at least one preferred embodiment, an apparatus for performing hybrid power control in an electronic device is provided, where the apparatus may comprise at least one portion (e.g. a portion or all) of the electronic device. For example, the apparatus may comprise a charger that is positioned in the electronic device, and the charger may be arranged for selectively charging a battery of the electronic device, wherein at least one portion (e.g. a portion or all) of the charger may be implemented within a charger chip. More particularly, the charger may comprise: a first terminal, positioned on the charger chip; a second terminal, positioned on the charger chip and selectively coupled to the first terminal; a third terminal, positioned on the charger chip and selectively coupled to the second terminal; a fourth terminal, positioned on the charger chip; a battery terminal, positioned on the charger chip; a plurality of switching units, positioned on the charger chip; and a control circuit, positioned on the charger chip and coupled to the plurality of switching units. For example, the first terminal may be arranged for coupling the charger to a power input port of the electronic device, wherein the power input port is utilized for selectively obtaining external power from outside the electronic device. The second terminal may be arranged for delivering the external power obtained through the first terminal to at least one internal component of the charger chip when needed, and the third terminal and the fourth terminal may be arranged for installing an inductor of the charger, wherein a first terminal of the inductor may be coupled to the third terminal, and a second terminal of the inductor may be coupled to the fourth terminal. The battery terminal may be arranged for coupling the charger to the battery. In addition, the plurality of switching units may be arranged for selectively enabling or disabling partial paths between components within the charger, wherein the plurality of switching units comprises: a first switching unit that is coupled between the second terminal and the third terminal; a second switching unit that is coupled between the second terminal and the first terminal; a third switching unit that is coupled between the fourth terminal and the battery terminal, wherein a first charging path of the charger passes through the second switching unit, the first switching unit, and the third switching unit; and an additional switching unit that is coupled between the second terminal and the battery terminal, wherein a second charging path of the charger passes through the second switching unit and the additional switching unit. Additionally, the control circuit may be arranged for controlling the plurality of switching units to allow charging using any of a plurality of adaptors corresponding to different voltages, wherein the first charging path and the second charging path correspond to a first adaptor and a second adaptor within the plurality of adaptors, respectively. In some embodiments, the apparatus may comprise the second adaptor.

It is an advantage of the present invention that the present invention apparatus can guarantee the overall performance of the whole system. In addition, the present invention apparatus can perform fast charging with fewer side effects. As a result, the related art problems are no longer an issue.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
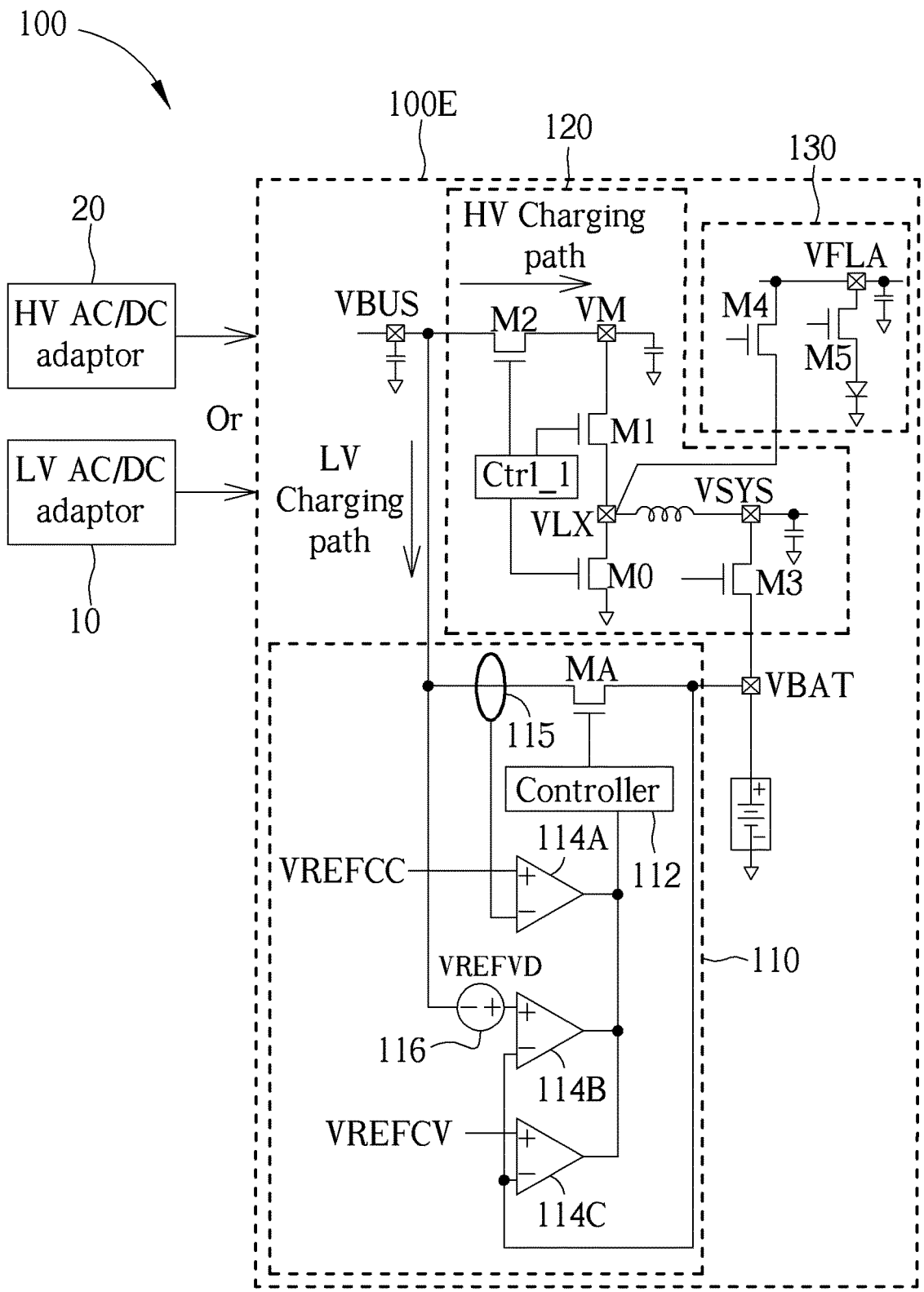
FIG. 1 is a diagram of an apparatus for performing hybrid power control in an electronic device according to an embodiment of the present invention.

FIG. 1 is a diagram of an apparatus for performing hybrid power control in an electronic device according to an embodiment of the present invention, where the apparatus may comprise at least one portion (e.g. a portion or all) of the electronic device. For example, the apparatus may comprise a portion of the electronic device mentioned above, and more particularly, can be at least one hardware circuit such as at least one integrated circuit (IC) within the electronic device and associated circuits thereof. In another example, the apparatus can be the whole of the electronic device mentioned above. In another example, the apparatus may comprise a system comprising the electronic device mentioned above (e.g. a wireless communications system comprising the electronic device). Examples of the electronic device may include, but not limited to, a multifunctional mobile phone, a tablet, and a laptop computer. For better comprehension, a portable electronic device 100E (e.g. any of the multifunctional mobile phone, the tablet, and the laptop computer mentioned above) can be taken as an example of the electronic device, and a plurality of adaptors corresponding to different voltages, such as a low voltage (LV) alternating current (AC)/direct current (DC) adaptor 10 and a high voltage (HV) AC/DC adaptor 20, are also illustrated in the electronic system 100. In some examples, the apparatus may comprise only a portion of the architecture shown in FIG. 1.

According to this embodiment, the apparatus may comprise a charger that is positioned in the electronic device, and the charger may be arranged for selectively charging a battery of the electronic device (e.g. the battery shown below the terminal VBAT in FIG. 1), where at least one portion (e.g. a portion or all) of the charger may be implemented within a charger chip, which can be taken as an example of the IC. For better comprehension, the pad notation of a square labeled "X" therein can be utilized for representing a pad of the IC, such as an input/output (I/O) pad of the IC. As shown in FIG. 1, the charger may comprise: a first terminal (which may be the terminal VBUS such as a pad in one example, or may be a terminal next to the terminal VBUS, such as a pad electrically connected to the terminal VBUS, directly, in another example), positioned on the charger chip; a second terminal (e.g. the terminal VM shown in FIG. 1, such as a pad), positioned on the charger chip and selectively coupled to the first terminal; a third terminal (e.g. the terminal VLX such as a pad), positioned on the charger chip and selectively coupled to the second terminal; and a fourth terminal (e.g. the terminal VSYS such as a pad), positioned on the charger chip and coupled to the third terminal. Please note that the charger may comprise some other terminals that are positioned on the charger chip, such as the terminals VFLA and VBAT. The terminal VSYS may be referred to as the system terminal, the terminal VFLA may be referred to as the flash terminal, and the terminal VBAT may be referred to as the battery terminal. In addition, the charger may comprise a plurality of switching units that may be positioned on the charger chip, such as the switching units M0, M1, M2, M3, M4, M5, and MA shown in FIG. 1, and may further comprise a control module that may be positioned on the charger chip and coupled to the plurality of switching units. For example, the control module may comprise at least one control circuit (e.g. one or more control circuits) positioned on the charger chip and coupled to the plurality of switching units, such as a control circuit Ctrl_1 coupled to the switching units M0, M1, M2, M3, M4, and M5 and a controller 112 coupled to the switching unit MA. Additionally, the charger may further comprise a feedback control circuit, positioned on the charger chip and coupled to the control module. For example, the feedback control circuit may comprise a plurality of monitoring circuits such as the three monitoring circuits 114A, 114B, and 114C, which can be operational transconductance amplifiers (OTAs) in this embodiment, and may further comprise a current detector 115 and a voltage clamping component such as a voltage difference (VD) regulator 116. Examples of the plurality of switching units may include, but not limited to, Metal Oxide Semiconductor Field Effect Transistors (MOSFETs). According to some embodiments, in a situation where at least one portion (e.g. a portion or all) of switching units within the plurality of switching units are implemented with transistors (e.g. Field Effect Transistors (FETs) such as MOSFETs), each switching unit of the aforementioned at least one portion of switching units may be regarded as a switching circuit.

For better comprehension, the terminal VBUS may be regarded as a power input terminal, and the terminals VSYS, VBAT, and VFLA may be regarded as power output terminals. For example, the first terminal (e.g. the terminal VBUS, or the aforementioned terminal next to the terminal VBUS) may be arranged for coupling the charger to a power input port of the electronic device, where the power input port is utilized for selectively obtaining external power from outside the electronic device, and the terminal VBUS can be a terminal of the power input port. In addition, the second terminal (e.g. the terminal VM) may be arranged for delivering the external power obtained through the first terminal and inputting the external power into at least one internal component of the charger chip when needed, and the third terminal (e.g. the terminal VLX) and the fourth terminal (e.g. the terminal VSYS) may be arranged for installing an inductor of the charger, such as the inductor illustrated between the terminals VLX and VSYS shown in FIG. 1, where a first terminal of the inductor may be coupled to the third terminal, and a second terminal of the inductor may be coupled to the fourth terminal. Additionally, the third terminal (e.g. the terminal VLX) may be arranged for interconnecting partial paths between components within the charger, and may be utilized for selectively bypassing the external power when needed, and the fourth terminal (e.g. the terminal VSYS) may be arranged for interconnecting a battery path from the battery (e.g. a section of path below the terminal VSYS in FIG. 1) and another partial path within the charger (e.g. a section of path at the left or the right of the terminal VSYS in FIG. 1). Further, the battery terminal (e.g. the terminal VBAT) may be arranged for coupling the charger to the battery.

Based on the architecture shown in FIG. 1, the charger may comprise a first power output path that is coupled to the fourth terminal (e.g. the terminal VSYS) and comprise a second power output path that is coupled to the third terminal (e.g. the terminal VLX), and may further comprise a third power output path that is coupled to the battery terminal (e.g. the terminal VBAT). For example, the first power output path may comprise at least one portion of the signal path from the terminal VSYS toward a system circuit (e.g. a main system circuit) of the electronic device, and therefore may be regarded as a system power output path for driving the system. In addition, the second power output path may comprise at least one portion of the signal path from the terminal VLX toward the terminal VFLA shown in FIG. 1, such as a flash path for driving a flash unit (e.g. a light emitting diode (LED) shown around the upper right of FIG. 1) of the electronic device, allowing the user of the electronic device to take photographs in poor light. Additionally, the third power output path may comprise at least one portion of the signal path from the terminal VBAT toward the battery shown in FIG. 1 when charging the battery is performed. For example, the first power output path (e.g. the system power output path) may be arranged for providing a first voltage level (e.g. a voltage level VSYS corresponding to the terminal VSYS), the second power output path (e.g. the flash path) may be arranged for selectively providing a second voltage level (e.g. a voltage level VFLA corresponding to the terminal VFLA), and the third power output path may be arranged for selectively providing a third voltage level (e.g. a voltage level VBAT corresponding to the terminal VBAT), where the second voltage level may be greater than the first voltage level, and the third voltage level may be different from the first voltage level and may be different from the second voltage level.

According to this embodiment, the plurality of switching units such as those shown in FIG. 1 may be arranged for selectively enabling or disabling partial paths between components within the charger. For example, the switching unit M1 coupled between the terminals VM and VLX may selectively enable or disable the signal path between the terminals VM and VLX. For another example, the switching unit M2 coupled between the terminals VBUS and VM may selectively enable or disable the signal path between the terminals VBUS and VM. For yet another example, the switching unit M0 coupled between the terminal VLX and at least one ground terminal (e.g. one or more ground terminals) may selectively enable or disable the signal path between the terminal VLX and the aforementioned at least one ground terminal. In addition, the control circuit Ctrl_1 may be arranged for controlling the sub-circuit 120 to provide the system circuit of the electronic device with the external power obtained from the first terminal (e.g. the terminal VBUS, or the aforementioned terminal next to the terminal VBUS) and/or to charge the battery, and may be arranged for controlling the sub-circuit 130 to drive the flash unit (e.g. the LED shown in FIG. 1). For example, the sub-circuit 120 may provide the system circuit with the external power. For another example, the sub-circuit 120 may charge the battery. For yet another example, the sub-circuit 120 may provide the system circuit with the external power and charge the battery at the same time. Additionally, the controller 112 may be arranged for controlling the sub-circuit 110 to charge the battery.

Regarding charging the battery, a first charging path of the charger may start from the first terminal (e.g. the terminal VBUS, or the aforementioned terminal next to the terminal VBUS) and pass through the switching unit M2, the switching unit M1, and the switching unit M3 and may reach the terminal VBAT, and a second charging path of the charger may start from the first terminal and pass through the switching unit MA and may reach the terminal VBAT. The control module (more particularly, the aforementioned at least one control circuit, which may comprise the control circuit Ctrl_1 and the controller 112 in this embodiment) may be arranged for controlling the plurality of switching units to allow charging using any of the plurality of adaptors corresponding to different voltages, such as the LV AC/DC adaptor 10 and the HV AC/DC adaptor 20, where the first charging path and the second charging path correspond to a first adaptor (e.g. the HV AC/DC adaptor 20) and a second adaptor (e.g. the LV AC/DC adaptor 10) within the plurality of adaptors, respectively. The output voltage of the first adaptor (e.g. the HV AC/DC adaptor 20) is typically higher than the output voltage of the second adaptor (e.g. the LV AC/DC adaptor 10), and therefore, within the first and the second charging paths, the first charging path can be regarded as a HV charging path while the second charging path can be regarded as a LV charging path. For example, in a situation where the output voltage of the HV AC/DC adaptor 20 is equal to 9 Volts (V), the charging current on the HV charging path may be equal to 2 Amperes (A). For another example, in a situation where the output voltage of the LV AC/DC adaptor 10 is equal to 4 V, the charging current on the LV charging path may be equal to 6 A. In some examples, the output voltage and the output current of each of the LV AC/DC adaptor 10 and the HV AC/DC adaptor 20 may vary.

According to this embodiment, the feedback control circuit may be arranged for performing feedback control on the second charging path through the switching unit MA. For example, the voltage clamping component such as the VD regulator 116 may have at least two terminals, and may be arranged to clamp the voltage difference between the voltage level VBUS at the first terminal (e.g. the terminal VBUS, or the aforementioned terminal next to the terminal VBUS) and the voltage level VBAT at the battery terminal VBAT, to control thermal performance of the charger, where one of the two terminals (e.g. the negative terminal thereof) is coupled to the first terminal of the charger, and the other of the two terminals (e.g. the positive terminal thereof) is coupled to an input terminal of the monitoring circuit 114B. The monitoring circuit 114B may be arranged for monitoring the voltage level VBAT at the battery terminal VBAT according to the voltage level at the positive terminal of the VD regulator 116. In addition, the current detector 115 may be arranged for detecting the charging current passing through the switching unit MA. The monitoring circuit 114A may be arranged for monitoring the charging current passing through the switching unit MA according to a reference signal VREFCC, which may be associated to constant current control of the charger regarding the second charging path (e.g. the LV charging path) and may be set by the controller 112. The monitoring circuit 114C may be arranged for monitoring the voltage level VBAT at the battery terminal VBAT according to another reference signal VREFCV, which may be associated to constant voltage control of the charger regarding the second charging path and may be set by the controller 112. Additionally, the controller 112 may be arranged for controlling the switching unit MA according to the output of the monitoring circuit 114A and according to the output of the monitoring circuit 114B and according to the output of the monitoring circuit 114C. For example, the output of the first monitoring circuit, the output of the second monitoring circuit, and the outputs of the monitoring circuits 114A, 114B, and 114C may be current outputs, and the controller 112 may control the switching unit MA according to the total current output of these current outputs. As shown in FIG. 5, a first feedback loop of the feedback control circuit may pass through the battery terminal VBAT, the monitoring circuit 114B, and the controller 112 and may reach the switching unit MA, a second feedback loop of the feedback control circuit may pass through the current detector 115, the monitoring circuit 114A, and the controller 112 and may reach the switching unit MA, and a third feedback loop of the feedback control circuit may pass through the battery terminal VBAT, the monitoring circuit 114C, and the controller 112 and may reach the switching unit MA.

Based on the architecture shown in FIG. 1, the present invention apparatus such as that of the embodiment shown in FIG. 1 can guarantee the overall performance of the whole system. In addition, the present invention apparatus can perform fast charging with fewer side effects. As a result of implementing electronic products according to the present invention, the probability of damage of the battery and/or charger system can be greatly reduced.

Figure 2:
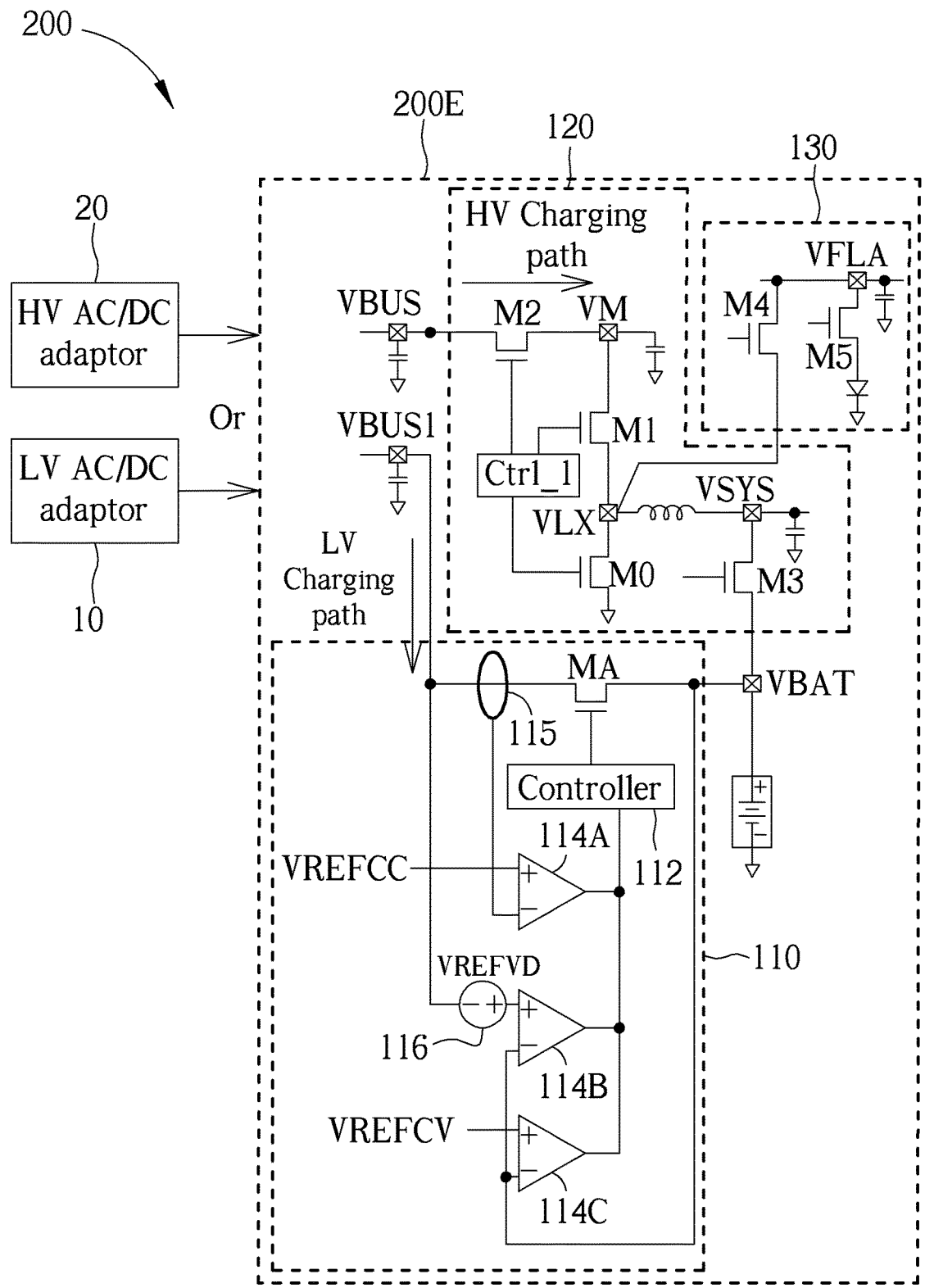
FIG. 2 is a diagram of an apparatus for performing hybrid power control in an electronic device according to another embodiment of the present invention.

FIG. 2 is a diagram of an apparatus for performing hybrid power control in an electronic device such as that mentioned above according to another embodiment of the present invention, where the apparatus may comprise at least one portion (e.g. a portion or all) of the electronic device. In comparison with the embodiment shown in FIG. 1, the terminal VBUS in the portable electronic device 100E shown in FIG. 1 is split into multiple terminals VBUS and VBUS1 respectively corresponding to the first and the second charging paths in this embodiment. In response to the change in architecture, the notation "100E" is replaced by the notation "200E" as shown in FIG. 2. For better comprehension, the portable electronic device 200E (e.g. any of the multifunctional mobile phone, the tablet, and the laptop computer mentioned above) can be taken as an example of the electronic device, and the plurality of adaptors corresponding to different voltages, such as the LV AC/DC adaptor 10 and the HV AC/DC adaptor 20, are also illustrated in the electronic system 200. In some examples, the apparatus may comprise only a portion of the architecture shown in FIG. 2.

According to this embodiment, the terminals VBUS and VBUS1 respectively corresponding to the first and the second charging paths allow the charger to use the LV AC/DC adaptor 10 and the HV AC/DC adaptor 20 independently at the same time, and the control circuit Ctrl_1 may control switching operations of the switching unit MA when needed. For example, when charging using the second charging path (e.g. the LV charging path) is required, the control circuit Ctrl_1 may turn on the switching unit MA. In another example, when charging using the first charging path (e.g. the HV charging path) is required, the control circuit Ctrl_1 may turn off the switching unit MA. In another example, when using any of the sub-circuits 120 and 130 is required, the control circuit Ctrl_1 may turn off the switching unit MA. For brevity, similar descriptions for this embodiment are not repeated in detail here.

According to some embodiments, under control of the control module (more particularly, the aforementioned at least one control circuit, which may comprise the control circuit Ctrl_1 and the controller 112 in these embodiment), the charger may provide the battery with the external power obtained through the terminal VBUS1 and provide at least one internal circuit of the electronic device with the external power obtained through the first terminal (e.g. the terminal VBUS, or the aforementioned terminal next to the terminal VBUS) at the same time. For example, the aforementioned at least one internal circuit of the electronic device may comprise one or a combination of the system circuit of the electronic device (e.g. the main system circuit) and the flash unit (e.g. the LED). For brevity, similar descriptions for these embodiments are not repeated in detail here.

According to some embodiments, under control of the control module (more particularly, the aforementioned at least one control circuit, which may comprise the control circuit Ctrl_1 and the controller 112 in these embodiment), the charger may provide the battery with both of the external power obtained through the terminal VBUS1 and the external power obtained through the first terminal (e.g. the terminal VBUS, or the aforementioned terminal next to the terminal VBUS) at the same time, to charge the battery. For example, the total charging current may be calculated by at least one processor in the system circuit of the electronic device (e.g. the main system circuit), and may be shared by the first and the second charging paths according to the associated calculation results under control of the controller 112 (e.g. the controller 112 may control the on resistance of the switching unit MA such as a MOSFET according to the calculation results. For brevity, similar descriptions for these embodiments are not repeated in detail here.

According to some embodiments, the total charging current may be calculated by the control module, and may be shared by the first and the second charging paths according to the associated calculation results under control of the controller 112 (e.g. the controller 112 may control the on resistance of the switching unit MA such as a MOSFET according to the calculation results. For brevity, similar descriptions for these embodiments are not repeated in detail here.

Figure 3:
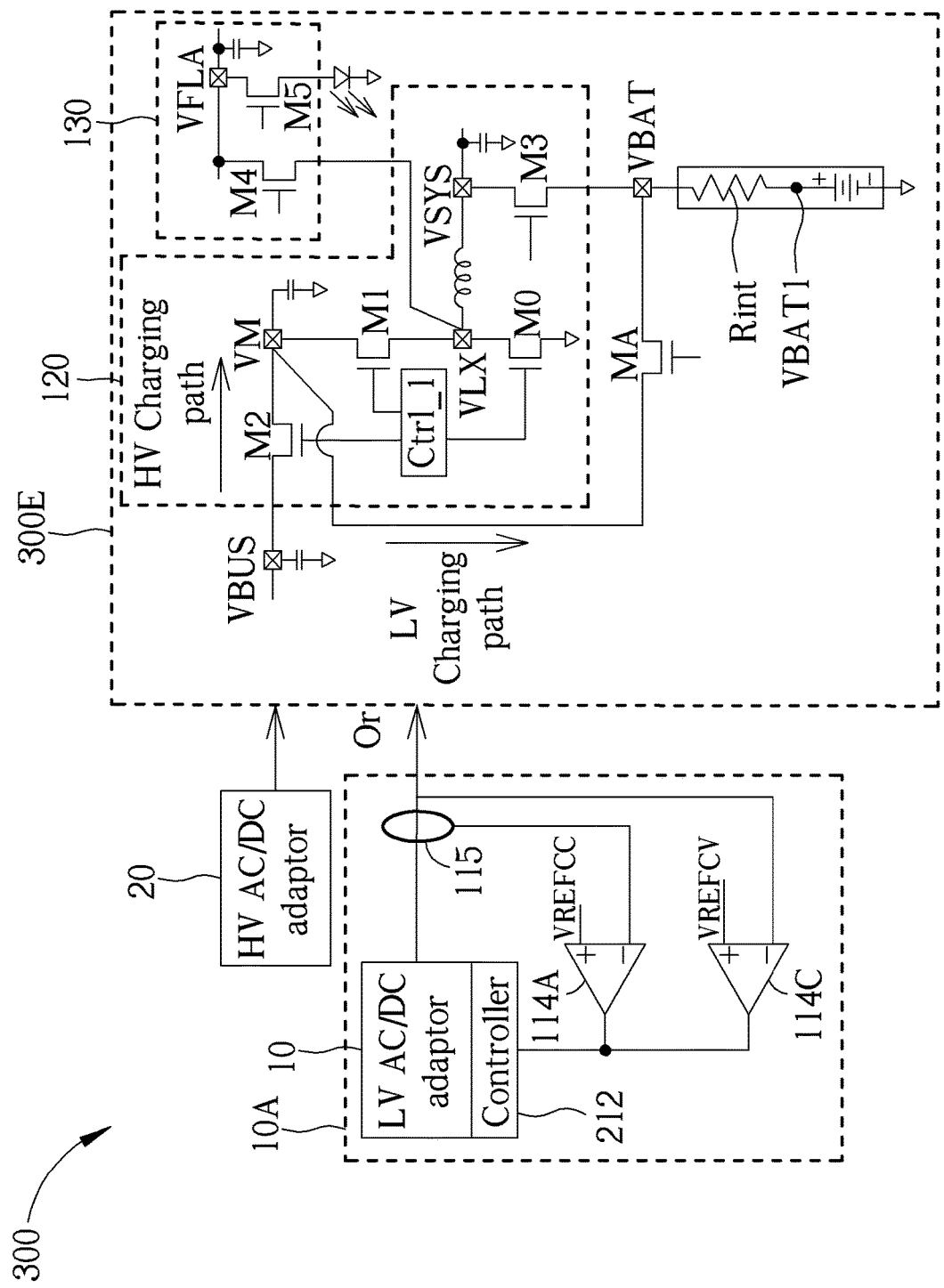
FIG. 3 is a diagram of an apparatus for performing hybrid power control in an electronic device according to another embodiment of the present invention.

FIG. 3 is a diagram of an apparatus for performing hybrid power control in an electronic device such as that mentioned above according to another embodiment of the present invention, where the apparatus may comprise at least one portion (e.g. a portion or all) of the electronic device. In comparison with the embodiment shown in FIG. 1, the switching unit MA of this embodiment is electrically connected to the terminal VM (rather than the terminal VBUS), and some components in the feedback control circuit for the second charging path are implemented within an advanced LV AC/DC adaptor 10A, where the control circuit Ctrl_1 may control the switching unit MA when needed. In addition, the second charging path of the charger may start from the first terminal (e.g. the terminal VBUS, or the aforementioned terminal next to the terminal VBUS) and pass through the switching unit M2 and the switching unit MA and may reach the terminal VBAT. In response to the change in architecture, the notations "100E" and "112" are replaced by the notations "300E" and "212" as shown in FIG. 2. For better comprehension, the portable electronic device 300E (e.g. any of the multifunctional mobile phone, the tablet, and the laptop computer mentioned above) can be taken as an example of the electronic device, and the plurality of adaptors corresponding to different voltages, such as the advanced LV AC/DC adaptor 10A and the HV AC/DC adaptor 20, are also illustrated in the electronic system 300. In some examples, the apparatus may comprise only a portion of the architecture shown in FIG. 3.

According to this embodiment, the control circuit Ctrl_1 may control switching operations of the switching unit MA when needed. For example, when charging using the second charging path is required, the control circuit Ctrl_1 may turn on the switching unit MA. In another example, when charging using the first charging path is required, the control circuit Ctrl_1 may turn off the switching unit MA. In another example, when using any of the sub-circuits 120 and 130 is required, the control circuit Ctrl_1 may turn off the switching unit MA. In addition, the controller 212 may control the output current of the second adaptor such as the advanced LV AC/DC adaptor 10A according to the output of the monitoring circuit 114A and according to the output of the monitoring circuit 114C. In addition, the controller 212 may control the reference signal VREFCV to correspond to a summation of a target voltage level Target_VBAT of the battery terminal VBAT and at least one offset (e.g. one or more offsets), where the aforementioned at least one offset may comprise the product of the output current of the second adaptor such as the advanced LV AC/DC adaptor 10A and a computed resistance value Rcomp associated to the second charging path, and the computed resistance value Rcomp may comprise a factor corresponding to the internal impedance Rint of the battery. For example, the internal impedance Rint of the battery may comprise one or a combination of the internal impedance of battery cell(s) within the battery and the internal impedance of an internal IC within the battery. For brevity, similar descriptions for this embodiment are not repeated in detail here.

According to some embodiments, the detection of the internal impedance Rint of the battery may be performed by the controller 212 or the control circuit Ctrl_1. For brevity, similar descriptions for these embodiments are not repeated in detail here.

According to some embodiments, the apparatus may comprise the second adaptor such as the advanced LV AC/DC adaptor 10A. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for performing hybrid power control in an electronic device, the apparatus comprising:
    a charger, positioned in the electronic device, arranged for selectively charging a battery of the electronic device, wherein at least one portion of the charger is implemented within a charger chip, and the charger comprises:
        a first terminal, positioned on the charger chip, arranged for coupling the charger to a power input port of the electronic device, wherein the power input port is utilized for selectively obtaining external power from outside the electronic device;
        a second terminal, positioned on the charger chip and selectively coupled to the first terminal, arranged for delivering the external power obtained through the first terminal to at least one internal component of the charger chip when needed;
        a third terminal, positioned on the charger chip and selectively coupled to the second terminal, arranged for installing an inductor of the charger, wherein a first terminal of the inductor is coupled to the third terminal;
        a fourth terminal, positioned on the charger chip, arranged for installing the inductor, wherein a second terminal of the inductor is coupled to the fourth terminal;
        a battery terminal, positioned on the charger chip, arranged for coupling the charger to the battery;
        a plurality of switching units, positioned on the charger chip, arranged for selectively enabling or disabling partial paths between components within the charger, wherein the plurality of switching units comprises:
            a first switching unit, coupled between the second terminal and the third terminal;
            a second switching unit, coupled between the second terminal and the first terminal;
            a third switching unit, coupled between the fourth terminal and the battery terminal, wherein a first charging path of the charger passes through the second switching unit, the first switching unit, and the third switching unit; and
            an additional switching unit, coupled between the first terminal and the battery terminal, wherein a second charging path of the charger passes through the additional switching unit;
        a control module comprising at least one control circuit, positioned on the charger chip and coupled to the plurality of switching units, arranged for controlling the plurality of switching units to allow charging using any of a plurality of adaptors corresponding to different voltages, wherein the first charging path and the second charging path correspond to a first adaptor and a second adaptor within the plurality of adaptors, respectively; and
    a feedback control circuit, positioned on the charger chip and coupled to the control module, arranged for performing feedback control on the second charging path through the additional switching unit.

2. The apparatus of claim 1, wherein the feedback control circuit comprises:
    a voltage clamping component, having at least two terminals, arranged to clamp a voltage difference between a voltage level at the first terminal and a voltage level at the battery terminal, to control thermal performance of the charger, wherein one terminal of the at least two terminals is coupled to the first terminal; and
    a first monitoring circuit, coupled to the voltage clamping component, arranged for monitoring the voltage level at the battery terminal according to a voltage level at another terminal of the at least two terminals of the voltage clamping component;
    wherein the at least one control circuit comprises:
    a controller, coupled to the first monitoring circuit and the additional switching unit, arranged for controlling the additional switching unit at least according to an output of the first monitoring circuit.

3. The apparatus of claim 2, wherein the voltage clamping component comprises a voltage difference (VD) regulator.

4. The apparatus of claim 2, wherein the feedback control circuit further comprises:
    a current detector, arranged for detecting a charging current passing through the additional switching unit; and
    a second monitoring circuit, coupled to the current detector and the controller, arranged for monitoring the charging current passing through the additional switching unit according to a reference signal;
    wherein the controller controls the additional switching unit at least according to the output of the first monitoring circuit and according to an output of the second monitoring circuit.

5. The apparatus of claim 4, wherein the feedback control circuit further comprises:
    a third monitoring circuit, coupled to the battery terminal and the controller, arranged for monitoring the voltage level at the battery terminal according to another reference signal;
    wherein the controller controls the additional switching unit according to the output of the first monitoring circuit and according to the output of the second monitoring circuit and according to an output of the third monitoring circuit.

6. The apparatus of claim 5, wherein the output of the first monitoring circuit, the output of the second monitoring circuit, and the output of the third monitoring circuit are current outputs, wherein the controller controls the additional switching unit according to a total current output of the current outputs.

7. The apparatus of claim 5, wherein a first feedback loop of the feedback control circuit passes through the battery terminal, the first monitoring circuit, and the controller, and reaches the additional switching unit; a second feedback loop of the feedback control circuit passes through the current detector, the second monitoring circuit, and the controller, and reaches the additional switching unit; and a third feedback loop of the feedback control circuit passes through the battery terminal, the third monitoring circuit, and the controller, and reaches the additional switching unit.

8. The apparatus of claim 5, wherein the feedback control circuit comprises a plurality of OTAs positioned on a plurality of feedback loops of the feedback control circuit, respectively, wherein the first monitoring circuit, the second monitoring circuit, and the third monitoring circuit are three of the OTAs.

9. The apparatus of claim 4, wherein a first feedback loop of the feedback control circuit passes through the battery terminal, the first monitoring circuit, and the controller, and reaches the additional switching unit; and a second feedback loop of the feedback control circuit passes through the current detector, the second monitoring circuit, and the controller, and reaches the additional switching unit.

10. The apparatus of claim 4, wherein the feedback control circuit comprises a plurality of OTAs positioned on a plurality of feedback loops of the feedback control circuit, respectively, wherein the first monitoring circuit and the second monitoring circuit are two of the OTAs.

11. The apparatus of claim 2, wherein a first feedback loop of the feedback control circuit passes through the battery terminal, the first monitoring circuit, and the controller, and reaches the additional switching unit.

12. The apparatus of claim 2, wherein the feedback control circuit comprises a plurality of OTAs positioned on a plurality of feedback loops of the feedback control circuit, respectively, wherein the first monitoring circuit is one of the OTAs.

13. The apparatus of claim 1, wherein an output voltage of the first adaptor is higher than an output voltage of the second adaptor, wherein within the first and the second charging paths, the first charging path is a high voltage charging path while the second charging path is a low voltage charging path.

14. An apparatus for performing hybrid power control in an electronic device, the apparatus comprising:
a charger, positioned in the electronic device, arranged for selectively charging a battery of the electronic device, wherein at least one portion of the charger is implemented within a charger chip, and the charger comprises:
a first terminal, positioned on the charger chip, arranged for coupling the charger to a power input port of the electronic device, wherein the power input port is utilized for selectively obtaining external power from outside the electronic device;
a second terminal, positioned on the charger chip and selectively coupled to the first terminal, arranged for delivering the external power obtained through the first terminal to at least one internal component of the charger chip when needed;
a third terminal, positioned on the charger chip and selectively coupled to the second terminal, arranged for installing an inductor of the charger, wherein a first terminal of the inductor is coupled to the third terminal;
a fourth terminal, positioned on the charger chip, arranged for installing the inductor, wherein a second terminal of the inductor is coupled to the fourth terminal;
a battery terminal, positioned on the charger chip, arranged for coupling the charger to the battery;
another first terminal, positioned on the charger chip, arranged for coupling the charger to another power input port of the electronic device, wherein the other power input port is utilized for selectively obtaining external power from outside the electronic device;
a plurality of switching units, positioned on the charger chip, arranged for selectively enabling or disabling partial paths between components within the charger, wherein the plurality of switching units comprises:
a first switching unit, coupled between the second terminal and the third terminal;
a second switching unit, coupled between the second terminal and the first terminal;
a third switching unit, coupled between the fourth terminal and the battery terminal, wherein a first charging path of the charger passes through the second switching unit, the first switching unit, and the third switching unit; and
an additional switching unit, coupled between the other first terminal and the battery terminal, wherein a second charging path of the charger passes through the additional switching unit;
a control module comprising at least one control circuit, positioned on the charger chip and coupled to the plurality of switching units, arranged for controlling the plurality of switching units to allow charging using any of a plurality of adaptors corresponding to different voltages, wherein the first charging path and the second charging path correspond to a first adaptor and a second adaptor within the plurality of adaptors, respectively; and
a feedback control circuit, positioned on the charger chip and coupled to the control module, arranged for performing feedback control on the second charging path through the additional switching unit.

15. The apparatus of claim 14, wherein under control of the control module, the charger provides the battery with the external power obtained through the other first terminal and provides at least one internal circuit of the electronic device with the external power obtained through the first terminal at a same time.

16. The apparatus of claim 15, wherein the at least one internal circuit of the electronic device comprises one or a combination of a system circuit of the electronic device and a flash unit of the electronic device.

17. The apparatus of claim 14, wherein under control of the control module, the charger provides the battery with both of the external power obtained through the other first terminal and the external power obtained through the first terminal at a same time.

18. An apparatus for performing hybrid power control in an electronic device, the apparatus comprising:
a charger, positioned in the electronic device, arranged for selectively charging a battery of the electronic device, wherein at least one portion of the charger is implemented within a charger chip, and the charger comprises:
a first terminal, positioned on the charger chip, arranged for coupling the charger to a power input port of the electronic device, wherein the power input port is utilized for selectively obtaining external power from outside the electronic device;
a second terminal, positioned on the charger chip and selectively coupled to the first terminal, arranged for delivering the external power obtained through the first terminal to at least one internal component of the charger chip when needed;
a third terminal, positioned on the charger chip and selectively coupled to the second terminal, arranged for installing an inductor of the charger, wherein a first terminal of the inductor is coupled to the third terminal;

a fourth terminal, positioned on the charger chip, arranged for installing the inductor, wherein a second terminal of the inductor is coupled to the fourth terminal;

a battery terminal, positioned on the charger chip, arranged for coupling the charger to the battery;

a plurality of switching units, positioned on the charger chip, arranged for selectively enabling or disabling partial paths between components within the charger, wherein the plurality of switching units comprises:
- a first switching unit, coupled between the second terminal and the third terminal;
- a second switching unit, coupled between the second terminal and the first terminal;
- a third switching unit, coupled between the fourth terminal and the battery terminal, wherein a first charging path of the charger passes through the second switching unit, the first switching unit, and the third switching unit; and
- an additional switching unit, coupled between the second terminal and the battery terminal, wherein a second charging path of the charger passes through the second switching unit and the additional switching unit; and a control circuit, positioned on the charger chip and coupled to the plurality of switching units, arranged for controlling the plurality of switching units to allow charging using any of a plurality of adaptors corresponding to different voltages, wherein the first charging path and the second charging path correspond to a first adaptor and a second adaptor within the plurality of adaptors, respectively.

19. The apparatus of claim 18, wherein the second adaptor comprises:

a controller, arranged for controlling operations of the second adaptor; and a feedback control circuit, coupled to the controller, arranged for performing feedback control during charging using the second adaptor, wherein the feedback control circuit comprises:
- a current detector, arranged for detecting a charging current passing through the additional switching unit by detecting an output current of the second adaptor, wherein when a power output terminal of the second adaptor is electrically connected to the first terminal of the charger, the charging current passing through the additional switching unit is equivalent to the output current of the second adaptor;
- a first monitoring circuit, coupled to the current detector and the controller, arranged for monitoring the charging current passing through the additional switching unit according to a reference signal; and
- a second monitoring circuit, coupled to the power output terminal and the controller, arranged for monitoring a voltage level at the power output terminal according to another reference signal;

wherein the controller controls the output current of the second adaptor according to the output of the first monitoring circuit and according to the output of the second monitoring circuit; and the controller controls the other reference signal to correspond to a summation of a target voltage level of the battery terminal and at least one offset, wherein the at least one offset comprises a product of the output current of the second adaptor and a computed resistance value associated to the second charging path, and the computed resistance value comprises a factor corresponding to internal impedance of the battery.

20. The apparatus of claim 18, wherein the apparatus comprises the second adaptor.

* * * * *